Oct. 12, 1926.
L. S. HAMILTON
GAS TANK LOCK
Filed March 30, 1925
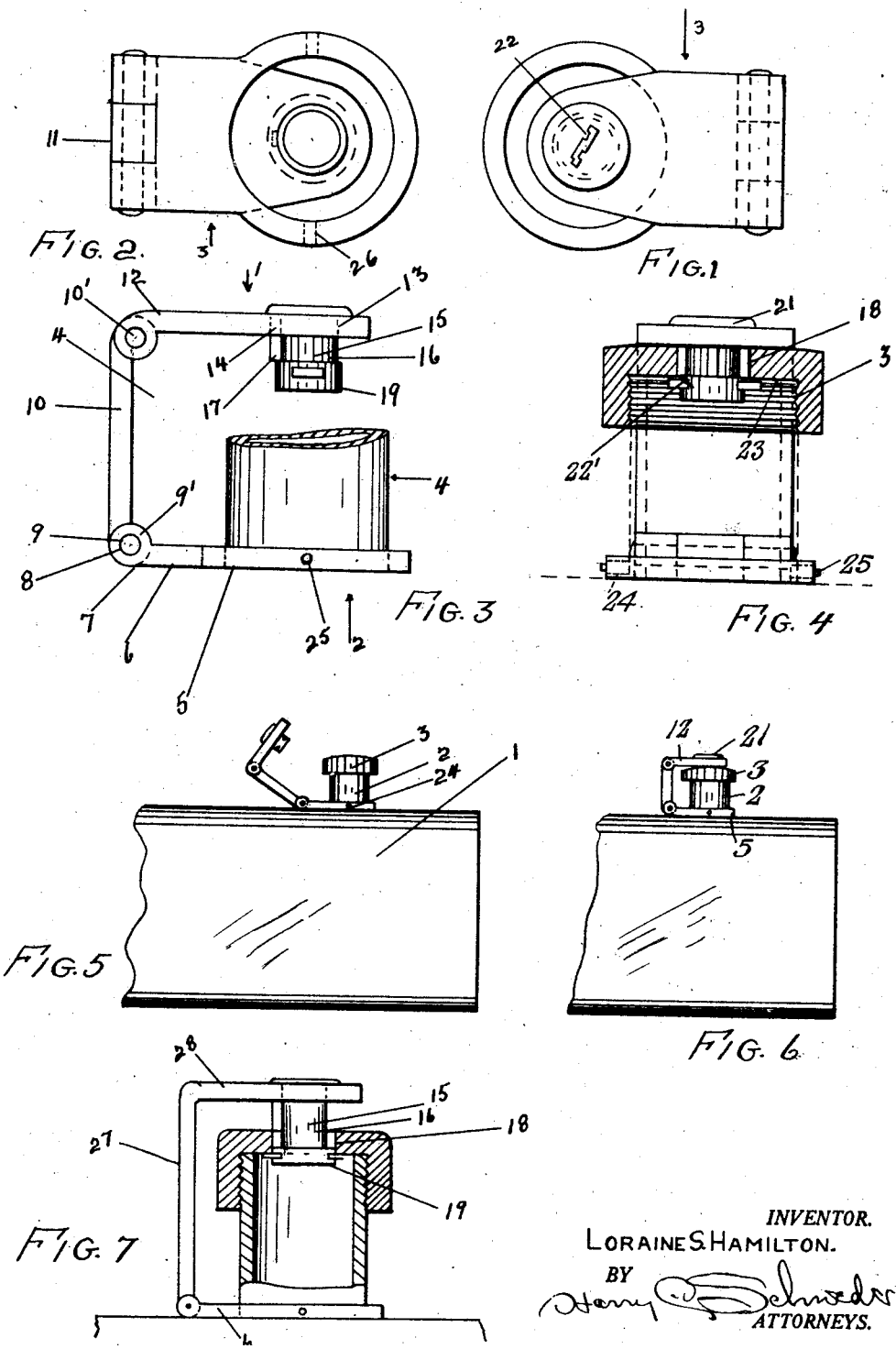
INVENTOR.
LORAINE S. HAMILTON.
BY
ATTORNEYS.

Patented Oct. 12, 1926.

1,602,900

UNITED STATES PATENT OFFICE.

LORAINE S. HAMILTON, OF BERKELEY, CALIFORNIA.

GAS-TANK LOCK.

Application filed March 30, 1925. Serial No. 19,290.

My invention comprises a gasoline tank lock adapted to fasten a cap of a gasoline tank or the like to prevent its unauthorized removal. The lock may be applied to the caps on other types of tanks or spouts or the like.

It has been found that gasoline is often stolen from automobile tanks by the thief removing the cap and withdrawing some of the gasoline with a siphon or by using suction.

The main object of my invention as above described is to lock the cap in position so that it may not be removed without unlocking. In order to adapt my invention to many types of tank filler tubes and caps, I secure a lock to a pivoted support or holder, preferably attached to the tube, the lock passes through an aperture in the cap after the cap is screwed into position by means of a key, and tumblers or bolts are operated to engage the inner side of the cap and thereby prevent the holder from being swung back to an inoperative position. My invention can be more readily understood from the following description considered with the drawings in which:—

Figure 1 is a plan of my gasoline tank lock showing it separated from the filler tube cap, the view being taken in the direction of the arrow 1 of Figure 3.

Figure 2 is a bottom view of the lock taken in the direction of the arrow 2.

Figure 3 is a side elevation of the cap lock in the direction of the arrow 3. This figure shows the filler tube broken away with the cap omitted.

Figure 4 is a front view of the lock in the direction of the arrow 4 of Figure 3, showing the cap in full lines and the filler tube dotted.

Figure 5 is a side elevational view of the gasoline tank, the filler tube and my lock applied to the filler tube. In this figure the device is in a position removed from the cap so that the cap may be taken off the filler tube.

Figure 6 is an elevation similar to Figure 5 with the cap locked in place on the filler tube.

Figure 7 is a modification of the above construction in which only one pivot is used to swing the lock and the lock is made with a long neck so that it may be raised clear of the cap before being swung sideways.

Referring to the drawings, a gasoline tank or the like is designated by the numeral 1, having a filler tube 2 and a cap 3 all of the ordinary type. The tank lock as a whole is designated by the numeral 4 and comprises a collar 5 adapted to fit over the filler tube and be inserted on the tube when the cap is removed. This collar has an off-set stem 6 with a series of lugs 7 thereon, having apertures 8 therethrough and the pintle 9 secured in the apertures. This forms a hinge 9'.

The lock support comprises a vertical strap 10 having one or more lugs 11, with apertures therethrough to engage the pin 9 and thereby form a hinge or pivot connection. The strap 10 is connected to a horizontal bar 12 by a hinge connection 10' similar to the hinge connecting the stem 6 with the vertical strap 10. In order to provide for the type of lock shown, the horizontal bar 12 has a circular aperture 13 with a key-way 14 at one side. A lock 15 is slidably mounted in the aperture, having a cylindrical neck 16 and a key 17 to prevent its rotation in the bar.

The hole 18 is formed in the cap 3 of sufficient diameter to allow the head 19 of the lock to pass therethrough, the plate 21 having a key-hole 22 resting on top of the bar 12. The lock-bolts 22' of which two are shown, are sufficient to engage the lower inside surface 23 of the cap. The manner of installing the lock is as follows:—

After the cap is removed from the filler tube 2, the collar 5 of the lock is slipped downwardly on the tube. The cap has a hole 18 drilled the proper size or a substitute cap is provided. This cap is then screwed into position and the lock inserted through the hole 18 in the cap until it may be locked by the bolts 22. When thus adjusted a hole 24 is drilled through the filler tube and a pin 25 or two pins from opposite sides are inserted through the holes 26 in the collar 5. In this manner the collar and the lock members supported thereby are held in proper position in relation to the filler tube cap. The manner of operating the lock is as follows:—

With the two hinges the lock device may be folded down flat on the gasoline tank if desired, as the lock 15 may be swung on the pivot 10', it having substantially a vertical movement in being withdrawn and inserted in the filler cap. Therefore, if desired, the lock may be rigidly attached to the bar 12. However, in order to make the hole 18 as small as possible to prevent the splashing of gasoline, it is desirable to allow the lock to slip upwardly on the neck 16 so that the lock, after the bolts 22 are drawn in, may be slightly raised before being swung on the hinge 10'. The manner of unlocking, swinging the lock back, removing the cap and replacing after filling the tank and relocking is obvious from the above description.

In Figure 7 a construction is shown in which only one hinge is used near the base. In this figure a vertical strap 27 is hinged to the stem 6 in the manner described in Figures 1 to 4. This strap is bent horizontally to form a horizontal strap 28 in which is slidably mounted the lock 15 in a manner similar to that above described. In this case, however, it is desirable to have the neck 16 of the lock sufficiently long to allow the head 19 to be completely withdrawn from the filler cap after the bolts 22 are retracted. The head is also designed to fit snugly in the hole of the cap to prevent the splashing of gasoline. In the sliding type of lock a head 19 is enlarged so that the lock cannot be withdrawn from the bar 12, or horizontal strap 28.

My invention may be considerably modified and changed in detail to suit different types of gasoline tanks and filler tubes or the like without departing from the spirit of my invention. For instance, the lock could be pivotally secured to some other permanent fixture instead of to the filler tube as shown.

Having described my invention what I claim is:—

1. A gasoline tank lock comprising in combination a tank, a filler tube therefor, a cap for the tube, a lock to engage the cap and a supporting device for the lock secured to said filler tube, said supporting device holding the lock in fixed relation to the cap when it is locked and allowing removal of the lock when it is unlocked.

2. A gasoline tank lock comprising in combination a gasoline tank, a filler tube and a cap therefor, having an opening through its top, a lock support slidable over the filler tube, a lock pivotally connected to said support, means to secure said support to the filler tube and bolts to secure the lock in the opening of the filler cap.

3. A lock for a tank filler cap comprising a supporting bar having a lock slidable therein, connecting means adapted to be permanently connected to a filler tube, and a pivotal connection between the lock supporting bar and the said connecting means.

4. A lock for a tank filler cap having in combination a collar adapted to fit over a filler tube, means adapted to secure the collar to a filler tube, a stem offset from the collar, a lock having transversely operating bolts, a bar to support said lock and pivotal connection between the said bar and the said stem, said lock being slidably mounted in the said bar.

5. A lock for a tank filler cap as claimed in claim 4, in which a plurality of pivots and a connecting link form the pivotal connection between the bar and the stem.

6. A gasoline tank lock comprising in combination a tank, a filler tube and a cap therefor, said cap having an opening through its top, a collar fitted over the filler tube and permanently attached thereto, a stem offset from the collar, a lock having transversely operating bolts, a bar supporting the lock above the cap with part of the lock extending through the hole in the cap and the bolts inside the cap and a pivotal connection between the said bar and the said stem the lock being slidably mounted in the said bar.

7. A gasoline tank lock as claimed in claim 6, in which a plurality of pivots and a connecting link form the pivotal connection between the bar and the stem.

In testimony whereof I affix my signature.

LORAINE S. HAMILTON.